US011159470B1

(12) United States Patent
Botwick et al.

(10) Patent No.: US 11,159,470 B1
(45) Date of Patent: Oct. 26, 2021

(54) LIVE DATABASE RECORDS IN A CHAT PLATFORM

(71) Applicant: salesforce.com, inc., San Francisco, CA (US)

(72) Inventors: Nate Botwick, San Francisco, CA (US); Anh Khuc, Millbrae, CA (US); Ben Cronin, San Francisco, CA (US); Matthew Chan, San Francisco, CA (US); Christopher Masterson, San Francisco, CA (US); David Engelberg, Seattle, WA (US); Diana Berlin, San Francisco, CA (US); Merwan Hade, San Francisco, CA (US); John Arlan Brock, Oakland, CA (US); Andrew Chung, Berkeley, CA (US); Justin Edmund, San Francisco, CA (US); Norris Lee, South San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/926,155

(22) Filed: Jul. 10, 2020

(51) Int. Cl.
*G06F 15/16* (2006.01)
*H04L 12/58* (2006.01)

(52) U.S. Cl.
CPC .............. *H04L 51/22* (2013.01); *H04L 51/12* (2013.01); *H04L 51/14* (2013.01); *H04L 51/16* (2013.01)

(58) Field of Classification Search
CPC ......... H04L 51/22; H04L 51/12; H04L 51/16; H04L 51/14; H04L 51/046
(Continued)

(56) References Cited

U.S. PATENT DOCUMENTS

2009/0055483 A1\* 2/2009 Madan .................... H04L 51/04
    709/206
2009/0070401 A1\* 3/2009 Welch, Jr. .............. G06Q 10/10
    709/201
(Continued)

FOREIGN PATENT DOCUMENTS

EP      1 596 546 A2    11/2005

OTHER PUBLICATIONS

International Search Report for International Patent Application No. PCT/US2021/015844, European Patent Office, The Netherlands, dated May 14, 2021.
(Continued)

*Primary Examiner* — Johnny B Aguiar
(74) *Attorney, Agent, or Firm* — Sterne, Kessler, Goldstein & Fox P.L.L.C.

(57) ABSTRACT

Described herein are a system, apparatus, device, method, and/or computer program product embodiments and/or combinations and sub-combinations thereof for displaying a live database record in a chat session. In a given embodiment, a collaborative communications system may cause display of a subset of fields the database record in a chat session. The collaborative communications system may detect activation of the chat session. The collaborative communications system may retrieve the current values of the subset of fields. Upon retrieval, the collaborative communications system causes display of the subset of fields of the database record including an updated value for a field in the chat session.

19 Claims, 9 Drawing Sheets

(58) Field of Classification Search
USPC ........ 709/204, 205, 206, 217, 227; 715/751, 715/753
See application file for complete search history.

(56) References Cited

U.S. PATENT DOCUMENTS

| | | | |
|---|---|---|---|
| 2009/0172101 A1* | 7/2009 | Arthursson | G06F 9/452 709/205 |
| 2009/0210459 A1* | 8/2009 | Nair | G06F 16/954 |
| 2012/0089659 A1* | 4/2012 | Halevi | G06F 3/04842 709/201 |
| 2015/0032686 A1* | 1/2015 | Kuchoor | G06Q 10/101 707/608 |
| 2016/0127428 A1* | 5/2016 | Flunkert | H04L 65/1069 715/753 |
| 2016/0285799 A1* | 9/2016 | Andreev | G06F 3/04842 |
| 2019/0026306 A1* | 1/2019 | Choi | H04L 51/046 |

OTHER PUBLICATIONS

Written Opinion for International Patent Application No. PCT/US2021/015844, European Patent Office, The Netherlands, dated May 14, 2021.

* cited by examiner

LIVE DATABASE RECORDS IN A CHAT PLATFORM

BACKGROUND

Users often use chat platforms to transmit messages and files to one another. However, conventional systems do not allow users to search for and transmit database records through chat platforms. As a result, users are forced to copy and paste data fields from a given database record into a chat platform if a given user wants to share the given database record. Furthermore, the data fields in the chat platform are static. Therefore, each time the data fields are updated, a user needs to copy and paste the data fields again to share the data fields. This may be an error-prone and time-consuming process.

BRIEF DESCRIPTION OF THE DRAWINGS

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

DETAILED DESCRIPTION

Provided herein are system, apparatus, device, method and/or computer program product embodiments, and/or combinations and sub-combinations thereof for rendering a live database record in a chat platform.

Chat platforms may often be used to transmit messages, images, or the like. Conventional systems only allow sharing static data fields in a chat platform, by requiring a user to copy-paste the desired data fields in the chat platform. However, as the content of the data fields may change over time, users may want to exchange several copies of the updated data fields as new versions are created. In some environments, it is useful to be able to transmit live database records using a chat session between two or more users, which is also not possible in conventional chat systems.

In a given embodiment, a collaborative communications system may detect a request from a user for a database record. The collaborative communications system may cause display of a subset of fields the database record in a chat session in response to the request for the database record. The chat session includes chat participants, and the chat participants include the user. The collaborative communications system may detect activation of the chat session based on input received from a chat participant. The collaborative communications system may transmit a request to an application programming interface (API) in a collaborative management system to retrieve current values of the subset of fields. Upon retrieval, the collaborative communications system identifies an updated value for a field of the subset of fields based on the current values of the subset of fields. Furthermore, the collaborative communications system causes display of the subset of fields of the database record including the updated value for the field in the chat session.

The above configuration allows users in the chat platform to see the current values of a database record each time a user opens the chat platform. The current values of the database record are rendered in the same portion of the chat where the original database record was rendered. This way, a user does not have to attempt to repeatedly retrieve the database record each time the user desires to view the current values of the database record. As such, this configuration saves operational resources by eliminating the step of a user searching for the database record each time the user wants to retrieve the current values of the database record for the chat platform.

Figure 1:
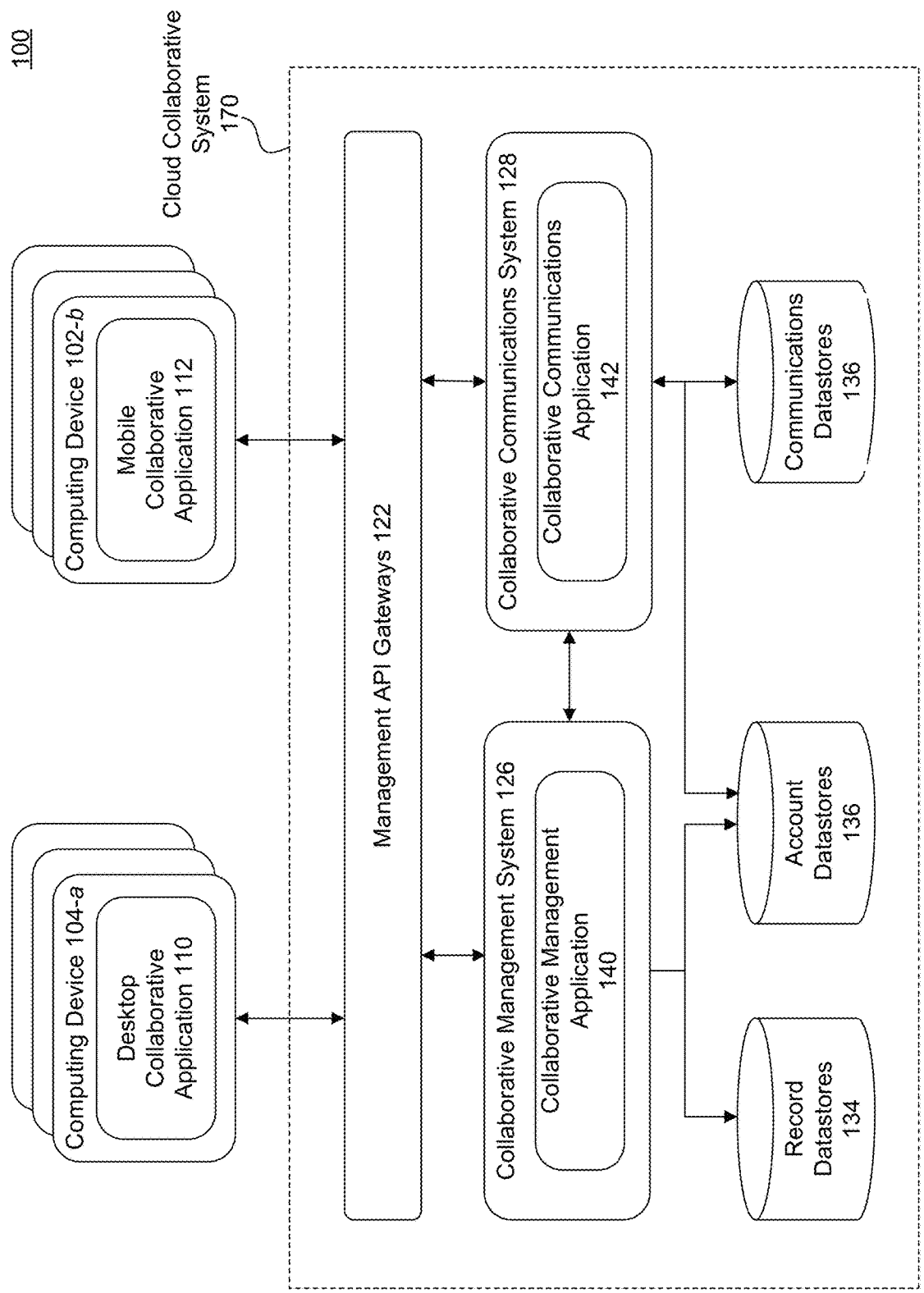
FIG. 1 is a block diagram of an architecture of a system for displaying live database records in a chat session, according to some embodiments.

FIG. 1 is a block diagram of system 100 for sharing of collaborative documents with users via instant messaging. System 100 may include one or more mobile devices 102-*b*, one or more computing devices 104-*a*, where the one or more mobile devices 102-*b*, one or more computing devices 104-*a* may be operatively and/or communicatively coupled to a cloud collaborative system 170. For example, the one or more computing devices 104-*a*, the one or more mobile devices 102-*b*, and/or the cloud collaborative system 170 of the system 100 may all be communicatively and/or operatively coupled together via wired connections, wireless connections, or a combination of wired and wireless connections as part of one or more communications networks.

In one example embodiment, the one or more communications networks may include, without limitation, an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In one embodiment, the one or more computing devices 104-*a* may be generally configured to execute one or more applications, which may include, without limitation, desktop collaborative application 110. For example, the one or more computing devices 104-*a* may be representative of desktop computing devices, server devices, virtual machines executing on desktop computing devices and/or server devices, and/or the like. An example implementation of a computing device 104-*a* is further illustrated and discussed with respect to FIG. 9.

In one embodiment, the one or more mobile devices **102-*b* may be generally configured to execute one or more mobile applications, which may include, without limitation, mobile collaborative application 112. For example, the one or more mobile devices 102-*b* may be representative of mobile phones, personal digital assistants, tablet computing devices, portable media players, and/or the like. An example implementation of a mobile device 102-*b* is further illustrated and discussed with respect to FIG. 8**.

In one embodiment, the desktop collaborative application 110 (e.g., a web browser, a native application, etc.) may be configured to visually present (or otherwise display) one or more user interface (UI) views on a display device operatively coupled to the respective computing device **104-*a*. The one or more UI views may be generally configured to allow a user of the desktop collaborative application 110 to allow a user to chat, in real-time, with other users via their respective computing devices 104-*a* and/or one or more mobile devices 102-*b*** using one or more chat UI views.

In one embodiment, the mobile collaborative application 112 (e.g., a mobile web browser, a native mobile application, etc.) configured to visually present (or otherwise display) one or more user interface (UI) views. The one or more UI views may be configured to allow a user of the mobile collaborative application 112 to chat, in real-time, with other users via their respective computing devices **104-*a* and/or one or more mobile devices 102-*b*** using one or more chat UI views.

In one embodiment, the cloud collaborative system 170 may include, without limitation, a management application program interface (API) gateway 122, a collaborative management system 126, a collaborative communications system 128, record datastores 134, accounts datastores 136, and communications datastores 138. All these systems, gateways, and datastores may be communicatively and/or operatively coupled together via one or more wired connections, wireless connections, or a combination of wired and wireless connections as part of one or more communications networks as illustrated in FIG. 1.

In one embodiment, the collaborative management system 126 may be generally configured to provide one or more cloud-computing services. The one or more cloud-computing services may include, without limitation, Infrastructure as a Service (IaaS), Software as a Service (SaaS), Platform as a Service (PaaS), Storage as a Service (StaaS), Mobile "backend" as a service (MBaaS), Function as a Service (FaaS), and/or any other cloud computing services. In one embodiment, the one or more cloud-computing services may also be generally implemented by one or more virtual machines executing on one or more server devices.

In one embodiment, the one or more cloud computing services of the collaborative management system 126 may be generally configured to execute one or more distributed applications, which may include, without limitation, collaborative management application 140. In one embodiment, the collaborative management application 140 may generally be configured to communicate and operate with desktop collaborative application 110 and mobile collaborative application 112 in order to provide an interface with records datastores 134 to provide live database records in chat sessions.

In one embodiment, the collaborative management application 140 may retrieve database records from records datastores 134, format the database record into a unitary user interface element, and transmit the unitary user interface element to the collaborative communications environment.

In one embodiment, collaborative management application 140 may also allow multiple users to collaborate together, in real-time or near real-time, to design, write, implement, edit, and finalize various forms of collaborative content such as, for example, one or more collaborative documents.

In one embodiment, the collaborative communications system 128 may be generally configured to provide one or more cloud-computing services similar to those discussed with respect to the collaborative management system 126. In one embodiment, the one or more cloud-computing services may also be generally implemented by one or more virtual machines executing on one or more server devices.

In one embodiment, the one or more cloud computing services of the collaborative communications system 128 may be generally configured to execute one or more distributed applications, which may include, without limitation, collaborative communications application 142. In one embodiment, the collaborative communications application 142 may generally be configured to communicate and operate with desktop collaborative application 110 and mobile collaborative application 112 in order to provide real-time instant messaging as further discussed herein.

It may be appreciated that while collaborative management system 126 and collaborative communications system 128 are illustrated as separate systems, these two systems may be combined into a combined system. Moreover, the combined system may then be configured to provide one or more cloud-computing services and execute the one or more distributed applications including, without limitation, the collaborative management application 140 and collaborative communications application 142.

In one embodiment, the record datastores 134 may be generally configured to store database records. A non-limiting example, the dataset records may be sales account records. The sales account records may include the name of the sales account, potential sale value, past sale value, target close date, current client, past client, potential client, or the like.

In one embodiment, the account datastores 136 and may be generally configured to manage user account information associated with each user of the collaborative management system 126 and collaborative communications system 128. The user account information for each user may include, without limitation, a user identifier (e.g., user's email, unique name, etc.), the full user name (e.g., first name and last name, etc.), user password (e.g., a hashed and salted version of an alphanumeric text, etc.), user image (e.g., an image or reference to a time associated with the user), permission settings, and/or any other information associated with a user.

In one embodiment, the communications datastores 138 may be generally configured to store chat history information with respect to a chat (or instant message) history between one or more users. In one embodiment, the chat history may include information relating to all chat sessions and/or conversations between a set of users. In one embodiment, the chat history information for each chat history between a set of users may include, without limitation, chat users list that identifies the user identifier of users that are engaged in the instant message conversation, chat history identifier that uniquely identifies a chat history between the set of users, and/or collaborative communications messages list between the set of users. The chat history may include the transmissions between the set of users. For example, the transmissions may include alphanumeric text, images, emojis, stickers, animations using the Graphics Interchange Format (GIFs), and database records.

Each of the one or more transmissions may include, without limitation, a set of transmission attributes and transmission content. In one embodiment, the set of communications message attributes may include, without limitation, transmission time attribute identifying a time the transmission was transmitted, transmission author attribute identifying a user in the set of users that sent the transmission, and/or any other transmission attributes. In one embodiment, transmission content may include, without limitation, alphanumeric text associated with the actual communications message stored in one or more text encodings and/or interpreted languages (e.g., hyper or subset thereof).

In one embodiment, the management API gateways 122 may be generally configured to provide one or more APIs to allow one or more applications (e.g., the collaborative management application 140, collaborative communications application 142, etc.) to communicate with the desktop collaborative application 110 and mobile collaborative application 112. For example, the management API gateways 122 may be configured to manage any incoming requests and provide corresponding responses between the one or more applications and the collaborative management system 126 and/or collaborative communications system 128 in accordance with one or more communication protocols.

Figure 2:
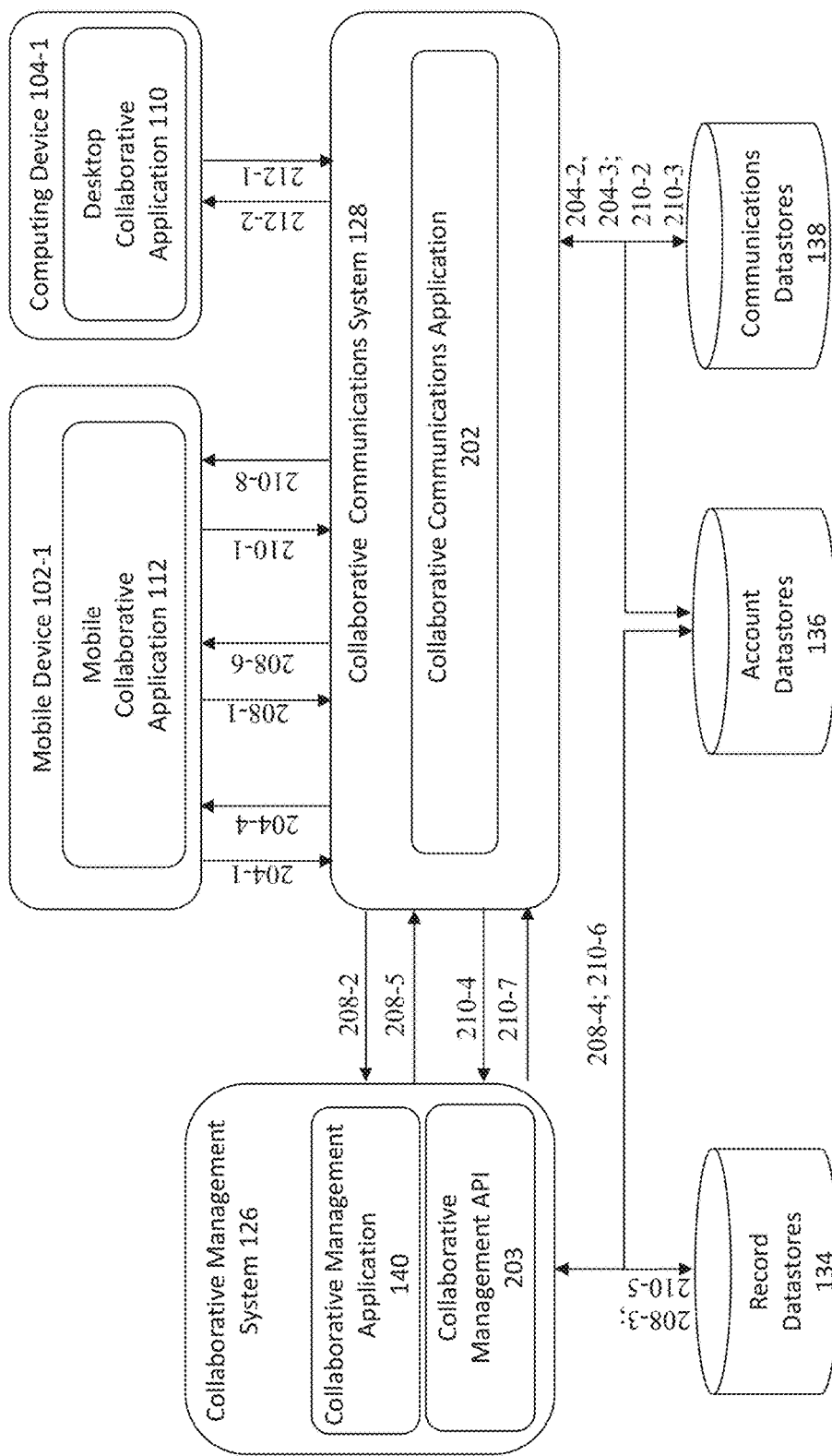
FIG. 2 is a block diagram of a data flow of a system for displaying live database records in a chat session, according to some embodiments.

FIG. 2 is a block diagram of a data flow 200 of a system for displaying live database records in a chat session. In a given embodiment, a mobile collaborative application 112 of mobile device 102-1 may transmit a request 204-1 to collaborative communications system 128 to initiate a chat session with one or more chat participants. For example, mobile collaborative application 112 may launch a chat platform, in response to input received from a user. As described above, the chat platform may be an application, which allows two or more chat participants to initiate a chat with each other. A chat participant may be a user of mobile device 102-1 or computing device 104-1. The two or more chat participants may transmit messages, images, emojis, GIFs, database records, or the like, to one another using the chat platform. Transmissions between the two or more users may be transmitted and received in a chat session. A chat participant may have multiple chat sessions with different chat participants using the chat platform.

A user may log in to the chat platform using a user name and password, or other authentication methods, in accordance with an embodiment. Once on the chat platform, the user (e.g., chat participant) may provide identifiers of one or more other users with whom the user would like to initiate a chat. The identifiers may be user names (such as a user name used at login), handles, employee identifier (ID) numbers, student ID numbers, randomly generated identifiers, or the like. Request 204-1 may include a user identifier of the user and identifiers of each of the one or more other users.

In response to receiving request 204-1, collaborative communications application 202 may transmit request 204-2 to communications datastores 138 to determine whether there is an existing chat session between the user and the one or more other users. In response to determining, a chat session does not exist between the user and the one or more other users, communications datastores 138 may transmit response 204-3 to collaborative communications application 202. Response 204-3 may indicate that a chat session between the user and the one more other users does not exist.

In response to receiving response 204-3, collaborative communications application 202 may initiate a new chat session between the user and the one or more other users. The user and the one or more other users may be chat participants of the chat session. Therefore, that chat session may include two or more chat participants. Collaborative communications application 202 may also generate a chat session identifier with the chat session. The chat session identifier may be stored in communications datastores 138. Collaborative communications application 202 may transmit response 204-4 to mobile collaborative application 112. Response 204-4 may include an instruction to the chat platform to initiate the new chat session.

Mobile collaborative application 112 may initiate the new chat session in the chat platform between the two or more chat participants, in response receiving response 204-4. Each of the two or more chat participants may transmit alphanumeric messages, images, GIFS, emojis, and database records in the chat session using the chat platform. A given chat participant may use mobile collaborative application 112 to send transmissions to one another in the chat session. Each alphanumeric transmission may be encoded using one or more descriptive languages (e.g., hypertext markup language (HTML) or subset thereof, etc.). The transmissions between the two or more chat participants may be stored in communications datastores 138. The transmissions may be stored in communications datastores 138 in (near) real-time. Alternatively, the transmissions may periodically be stored in communications datastores 138. The transmissions may be stored as chat history in communications datastores 138 and may be correlated to the chat session identifier.

Mobile collaborative application 112 may transmit request 208-1 to retrieve a database record to collaborative communications system 128. Request 208-1 may include a database record identifier (e.g., name, unique ID, or the like) and identifiers of the two or more chat participants. Collaborative communications application 202 may receive request 208-1 and may transmit request 208-2 for retrieving the database record to collaborative management system 126. Request 208-2 may include the database record identifier and the identifiers of the two or more chat participants.

Collaborative management application 140 may retrieve 208-3 the database record from records datastores 134 using the database record identifier, in response to collaborative management system 126 receiving the request 208-2. Collaborative management application 140 may format the retrieved database record into a unitary user interface element, including a subset of the fields of the database record. For example, collaborative management application 140 may determine that out of a given amount of fields in a database record, a subset of the fields are to be rendered in the chat session, based on the chat session settings or preferences.

Figure 5:
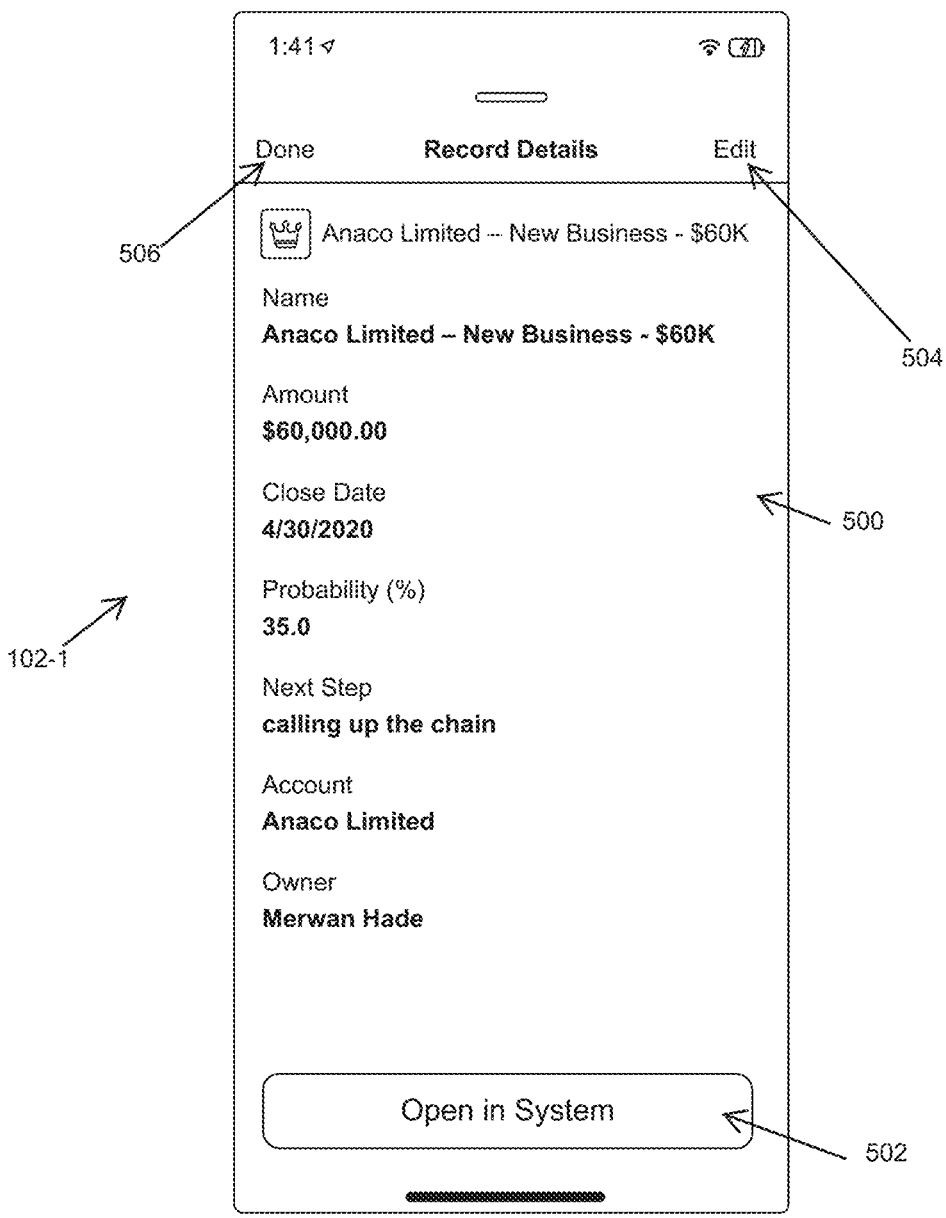
FIG. 5 is a user interface of an expanded view of a database record, according to some embodiments.

Collaborative management application 140 may encode the unitary user interface element with the database record identifier. Collaborative management application 140 may encode the unitary user interface element with a link to a screen for an expanded view of the database record, as shown in FIG. 5. The link may be a Uniform Resource Locator (URL)/Uniform Resource Identifier (URI).

The unitary user interface element may also include an icon (e.g., a small image). The collaborative management application 140 may retrieve an icon for the database record based on a value of a field of the database record. For example, the database record may be a sales record. The sales record may be an existing client, past client, or potential client. In this regard, the icon may represent the type of client.

Collaborative management application 140 may also retrieve 208-4 a permission setting for the user and the one or more other users using the identifiers of the two or more chat participants, from account datastores 136. The permission setting may indicate which database record fields a given chat participant is allowed to view. For example, one chat participant in the chat session may be allowed to view all the fields of the database record. Conversely, a different chat participant of the chat may only be allowed to view a portion of the database fields. Collaborative management application 140 may determine out of the subset of fields in the unitary user interface element, which fields a given chat participant may view, based on the permission settings. In this regard, collaborative management application 140 may remove a field from the subset of fields in the unitary user interface element if a given chat participant is not allowed to view the field. In this regard, collaborative management application 140 may generate different unitary user interface elements for each chat participant in the chat session. The different unitary user interface elements may be included in response 208-5. Collaborative management application 140 may transmit response 208-5 to collaborative communication system 128.

Collaborative communications application 202 may receive response 208-5. Response 208-5 may include the different unitary user interface elements for chat participants in the chat session. Collaborative communications application 202 may generate response 208-6. Response 208-6 may include a unitary user interface element for a given chat participant. As indicated above, a unitary user interface element may be specific for a given chat participant based on the chat participant's permission setting. A different response 208-6 may be generated for different chat participants, including their respective unitary user interface elements. Collaborative communications application 202 transmits response 208-6 to mobile collaborative application 112. Mobile collaborative application 112 may render the unitary user interface element depicting the database record in the chat session for a given chat participant. The unitary user interface element may include the fields of the database record, which the given chat participant is allowed to view.

As indicated above, the unitary user interface element may be encoded with a database record identifier and link to an expanded view of the database record. In response to a chat participant selecting the unitary user interface element, an expanded view of the database record may be displayed. The expanded view of the database record may be seen in FIG. 5.

The chat session may be deactivated based on user input. For example, a given chat participant may close out of a chat session. Alternatively, the chat session may be deactivated based on timing out or being minimized. As indicated above, the chat history between the two or more chat participants may be stored in communications datastores 138 and correlated with the chat session identifier.

Subsequently, the chat session may be activated based on an input from a given chat participant. The input may include opening the chat session, maximizing the chat session, or attempting to initiate a chat session with other users, with whom a chat session already exists. Each of these inputs may be transformed into request 210-1. Request 210-1 may be referred to as an activation request. Request 210-1 may include an identifier of the given chat participant that activated the chat session. Request 210-1 may be transmitted to collaborative communication system 128. Collaborative communications application 202 may transmit a request 210-2 to communications datastores 138 to retrieve a chat history of an existing chat session between the two or more chat participants.

In response to determining that a chat session exists between the two or more chat participants, communications datastores 138 may retrieve a chat history between the two or more chat participants. The chat history may include past transmissions between the two or more chat participants. The transmissions may include alphanumeric text messages, images, GIFs, emojis, and database records.

Communications datastores 138 may transmit response 210-3 to collaborative communications application 202. Response 210-3 may include the chat history. Collaborative communications application 202 may receive response 210-3. Collaborative communications application 202 may identify each database record in the chat history. The database record is depicted as a unitary user interface element. The unitary user interface element may be encoded with the database record identifier. Collaborative communications application 202 may extract the database record identifier form the unitary user interface element. Collaborative communications application 202 may generate and transmit request 210-4 to collaborative management system 126 to retrieve any updated values of the fields for each database record included in the chat history. Request 210-4 may include the fields of the database record included in the chat history, a unitary user interface element the given chat participant that activated the chat session, database record identifier, and identifier of the given chat participant that activated the chat session.

Collaborative management system 126 may receive the response. Collaborative Management API 203 may query 210-5 query record datastores 134 to retrieve updated values for any of the fields of the database record included in the chat history. For example, if the database record indicated a sales opportunity value of $5,000 for a database record in the chat history and had updated to $10,000 in records datastores 134, query 210-5 may retrieve the updated value of $10,000 for the database record. Conversely, if a value of a field of a database record has not been updated, query 210-5 may indicate that the value of the field has not been updated.

Collaborative management system 126 may also generate a message, including all of the updated fields. For example, the message may state, "Sales opportunity value has updated from $5,000 to $10,000." The message may be included the updated unitary user interface element.

Collaborative Management API 203 may retrieve 210-6 the permission setting for the given chat participant that activated the chat session from account datastores 136 using the identifier of the given chat participant. Collaborative management application 140 may determine which fields the given chat participant is allowed to view based on the permission setting for each user and chat participant. Collaborative management application 140 may update the unitary user interface element for the given chat participant that activated the chat session, based on the updated values of the fields and the permission setting. Therefore, the given chat participant may not be able to view the field even if the value of the fields has been updated.

Collaborative management application 140 may determine that based on an updated value of a field, the database record now corresponds with a new icon. For example, if a sales opportunity field of a database record has been updated from $5,000 to $10,000, the collaborative management application 140 may determine that the database record corresponds with a new icon. Collaborative management application 140 may include the new icon with the unitary user interface element.

Collaborative management application 140 may generate a response 210-7, including the updated unitary user interface element, the given chat participant that activated the chat session. Collaborative management application 140 may transmit response 210-7 to the collaborative communications system 128.

Collaborative communications application 202 may update the chat session of the given chat participant that activated the chat session with the updated unitary user interface element representing the database record. The chat session may be updated for each chat participant in response to activating the chat session. Collaborative communications application 202 may generate response 210-8, including the chat session. The chat session may include the chat history, including the updated unitary user interface element for each database record in the chat history. Collaborative communications application 202 may transmit response 210-8 to mobile device 102-1. Mobile collaborative application 112 may display the chat session in the chat platform. This way, each time a user activates or opens a chat session, the updated values of the database record included in the chat session are displayed in the chat session.

In some embodiments, the updated unitary user interface element may be displayed in the same position in the chat session where it was initially transmitted. This way, the chat session may maintain its timeline of transmissions while updating the values of the database record depicted by the unitary user interface element.

Desktop collaborative application 110 may also transmit a request 212-1 to collaborative communications system 128 to initiate a new chat, insert a database record, and activate an old chat, like mobile collaboration application 112. Furthermore, desktop collaborative application 110 may receive a response 212-2 from collaborative communications system 128. Response 212-2 may include a chat session, including chat history. The chat history may include previous transmissions between the two or more chat participants. The transmission may include messages, images, GIFs, emojis, and database records. The chat session received in response 212-2 may include the current values of the database recorded included in the chat history. Desktop collaborative application 110 may display the chat session in a chat platform being executed by the desktop collaborative application 110.

Figure 3:
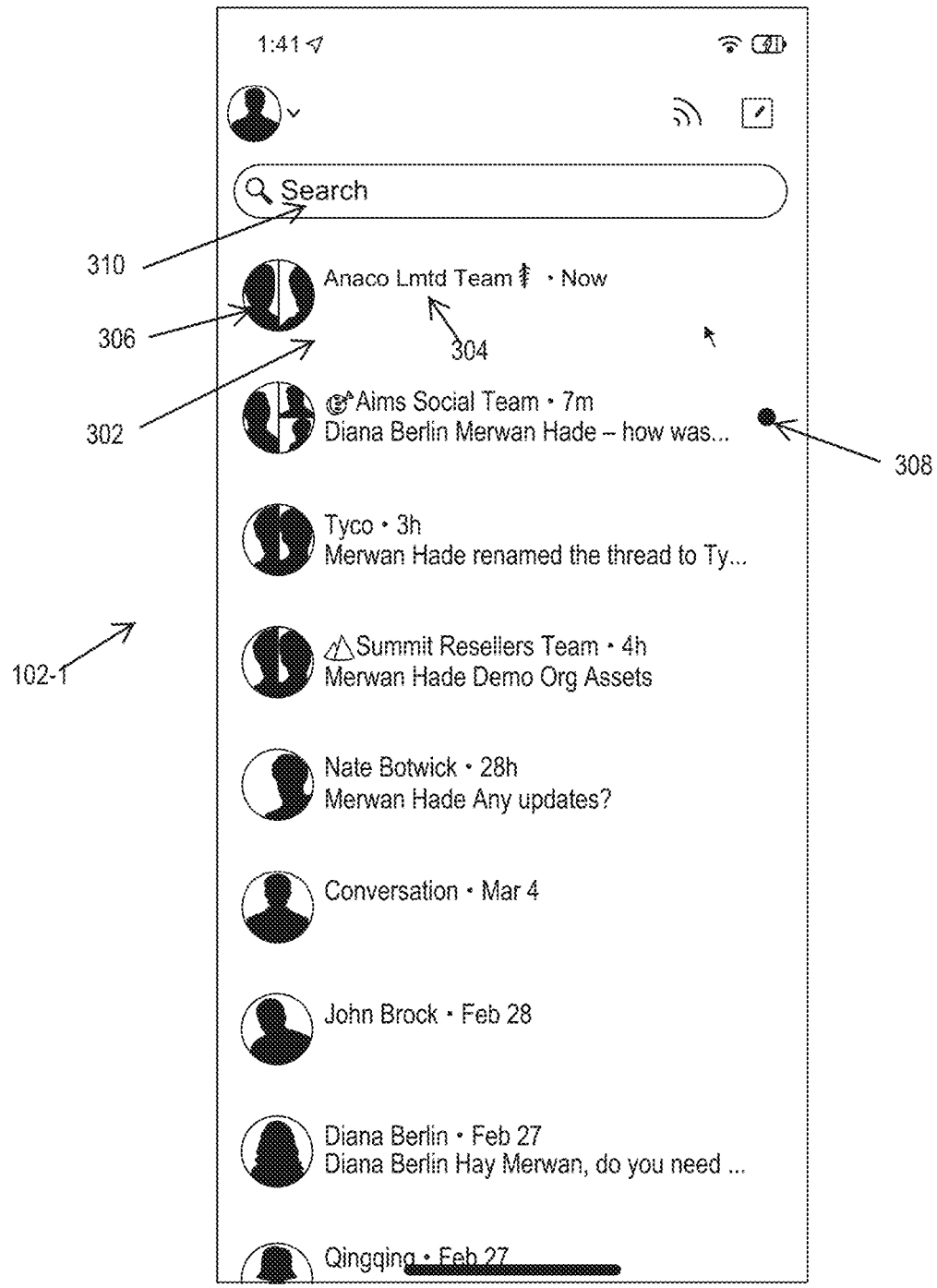
FIG. 3 is a user interface of a chat platform including multiple chat sessions, according to some embodiments.

FIG. 3 is a user interface of a chat platform including multiple chat sessions, according to some embodiments. In a given embodiment, mobile device 102-1 may render a user interface of a chat platform executing on a mobile collaborative application. The chat platform may include inactive chat sessions 302. Each chat session may include a chat name 304, an image 306 of other chat participants, and an indication 308 that a new message/unread message has been transmitted in a chat session 302.

A user may open (or activate) any of the chat sessions 302 by selecting one of the chat sessions. For example, a user may open the chat session 302 by clicking on the chat session 302. A user may click anywhere around the area of the chat session 302 to open the chat session.

The user interface may also include a preview of the last transmission in a chat session. Furthermore, the user interface may include a time when the last transmission was transmitted in the chat session.

The user interface may also include a search input box 310. A user may execute an input alphanumeric text in search input box 310 to execute a search in the chat sessions. The search may be dynamically updated for each character input in search input box 310.

Figure 4:
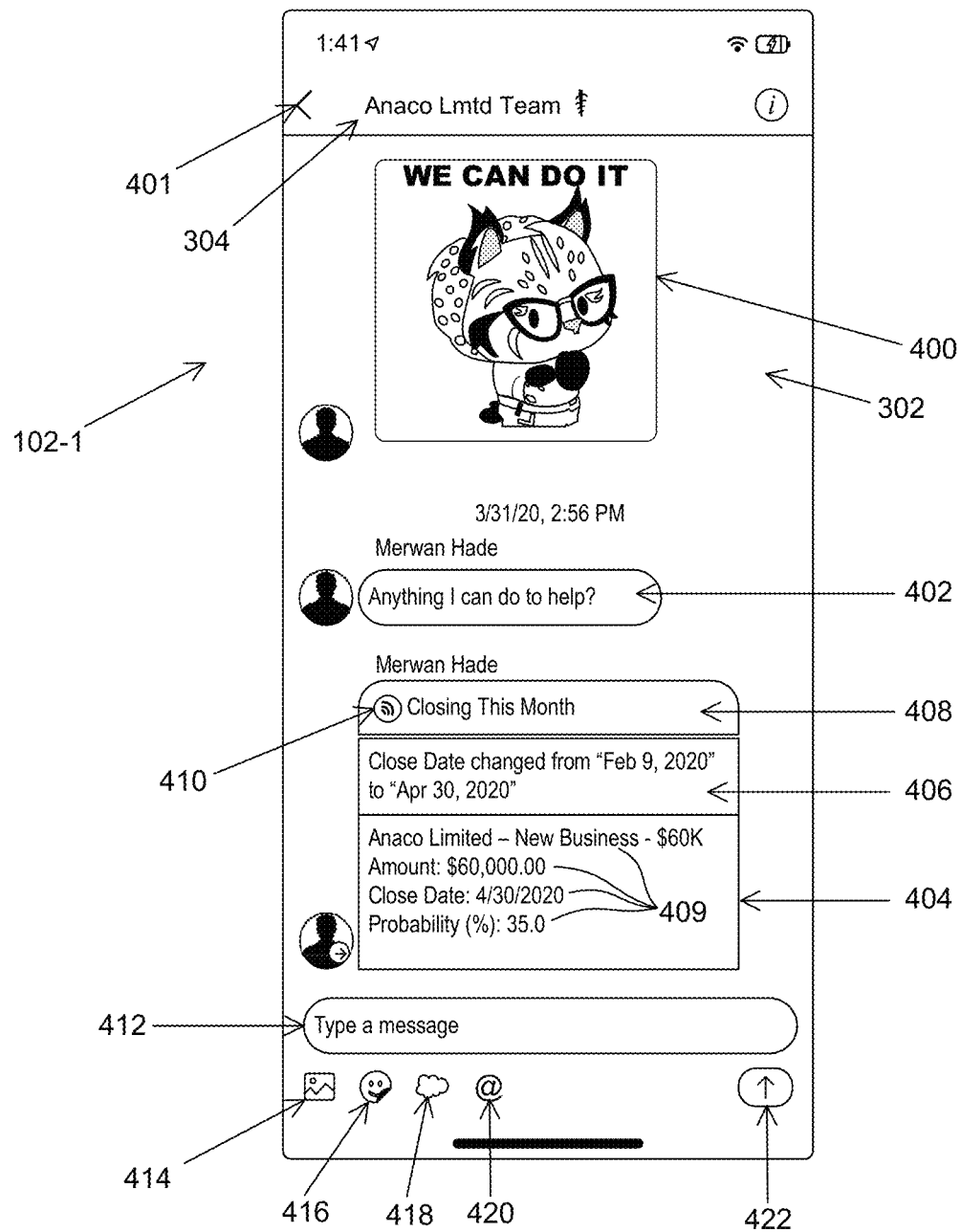
FIG. 4 is a user interface of a chat session, according to some embodiments.

FIG. 4 is a user interface of a chat session, according to some embodiments. As indicated in FIG. 3, a user may open (or activate) chat session 302 by selecting chat session 302. Mobile device 102-1 may render a user interface of a chat platform executing on a mobile collaborative application. The user interface may include chat session 302.

Chat session 302 may include a chat name and transmissions between other chat participants. The transmissions may include an image 400, text message 402, and database record 404. Database record 404 may be a unitary user interface element, including a record name 408, message 406, an icon 410, and a subset of fields 409 of database record 404.

The chat platform may also provide a message composer 412. The message composer may be used to input and transmit messages in the chat session. Furthermore, in response to inputting the '@' key, the chat platform may initiate a search for users or database records. For example, in response to inputting the '@' key, a list of users and database records may be displayed. In response to selecting a user, a message may be composed specifically directed to the user. In response to selecting a database record, a database record may be displayed in chat session 302.

The chat platform may also provide buttons 401, 414-422. Button 401 may be selected to collapse or close chat session 302. Collapsing or closing the chat session 302 may deactivate chat session 302. Button 414 may be selected to transmit an image in chat session 302. Button 416 may be selected to transmit an emoji or GIFs. Button 418 may be selected to search for and transmit database records. In response to selecting button 418, a list of database records may be displayed. In response to selecting a database record, a database record may be rendered in chat session 302. Button 420 may be selected to initiate a search for a user or database record. In response to selecting button 420, the '@' key may be input in message composer 412, and a list of users and database records may be displayed. A user may search for a specific user or database record by typing alphanumeric text after the '@' key. The list of users and database records may be filtered for each letter or number that is input in message composer 412 after the '@' key. Button 422 may be a submit button to send a message, image, emoji, GIF, or database record.

In a given embodiment, the collaborative communications system may detect the activation of chat session 302, in response to a user opening chat session 302. Detecting activation of chat session 302 may include receiving an activation request for opening chat session 302. An activation request may be generated based on a user input, such as the user clicking on/selecting chat session 302. The collaborative communications application may access the chat session identifier and identifiers of the other chat participants in chat session 302. The collaborative communications application may retrieve the chat history of chat session 302 from the communications datastores using the chat session identifier. The chat history may include transmissions between the other chat participants. The collaborative communications application may identify database record 404 in the chat history. The collaborative communications application may transmit a request to the collaborative management system to retrieve any updated values of database fields 409 of database record 404. Database fields 409 may be a subset of fields of the database record. Database fields 409 may be selected to be included in chat session 302 based on the chat settings or user preferences. The request may include the database record identifier, database fields 409, and identifiers of the other chat participants.

The collaborative management API may query the records datastores to retrieve any updated values of database fields 409. The collaborative management API may determine that the close date of the database record has been updated Feb. 9, 2020, to Apr. 30, 2020, based on the query.

The collaborative management application may retrieve the permission settings of the other chat participants from the accounts datastores. The collaborative management application may determine which fields a chat participant may view based on the permission settings.

The collaborative management application may modify the unitary user interface element of database record 404 based on the updated close date. The collaborative management application may also remove database fields from the unitary user interface element of database record 404, based on the permission settings of the other chat participants. As such, the collaborative management application may generate different unitary user interface elements for each chat participant, so that the chat participant only views fields that the user is allowed to view.

The collaborative management application may also generate message 406, indicating the update to the close date in the fields of database record 404. Message 406 may recite, "Close date has changed from "Feb. 9, 2020 to Apr. 30, 2020. Message 406 may be included in the unitary user interface element of database record 404.

The collaborative management application may transmit the updated unitary user interface element of database record 404 for each chat participant to the collaborative communications system. The collaborative communications application may include the updated unitary user interface element of database record 404 in the chat history for each chat participant. The collaborative communications application may transmit the chat history to mobile device 102-1 of each chat participant.

The mobile collaborative application may render the chat history, including the updated unitary user interface element of database record 404, in chat session 302, in response to the user opening chat session 302.

FIG. 5 is a user interface of an expanded view of a database record, according to some embodiments. A user may view an expanded view 500 of the database record (e.g., database record 404, as shown in FIG. 4) in response to a user selecting the database record in the chat session. Mobile device 102-1 may render a user interface of a chat platform executing on a mobile collaborative application. The user interface may include the expanded view 500 of the database record. The expanded view 500 may include additional fields not included in the unitary user interface element of the database record included in the chat session. The expanded view 500 may also include button 502. Button 502 may be selected to view the database record in the backend system.

A user may edit the fields of the database record by selecting edit selection 504. In response to selecting edit selection 504, the mobile collaborative application may transmit a request to the collaborative communications system. The request may include the identifier of the user who selected edit selection 504. The collaborative communications system may forward the request to the collaborative management system. Collaborative management application may retrieve the permission settings of the user using the identifier. The permissions settings may indicate which fields of the database record the user may edit. The collaborative management application may transmit permission settings to the collaborative communications system. Collaborative communications application may make the fields that the user is allowed to edit in the expanded view 500, editable for the user. The user's edits may be stored in the records datastores. The user may return to the chat session in response to selecting the "Done" selection 506.

Figure 6:
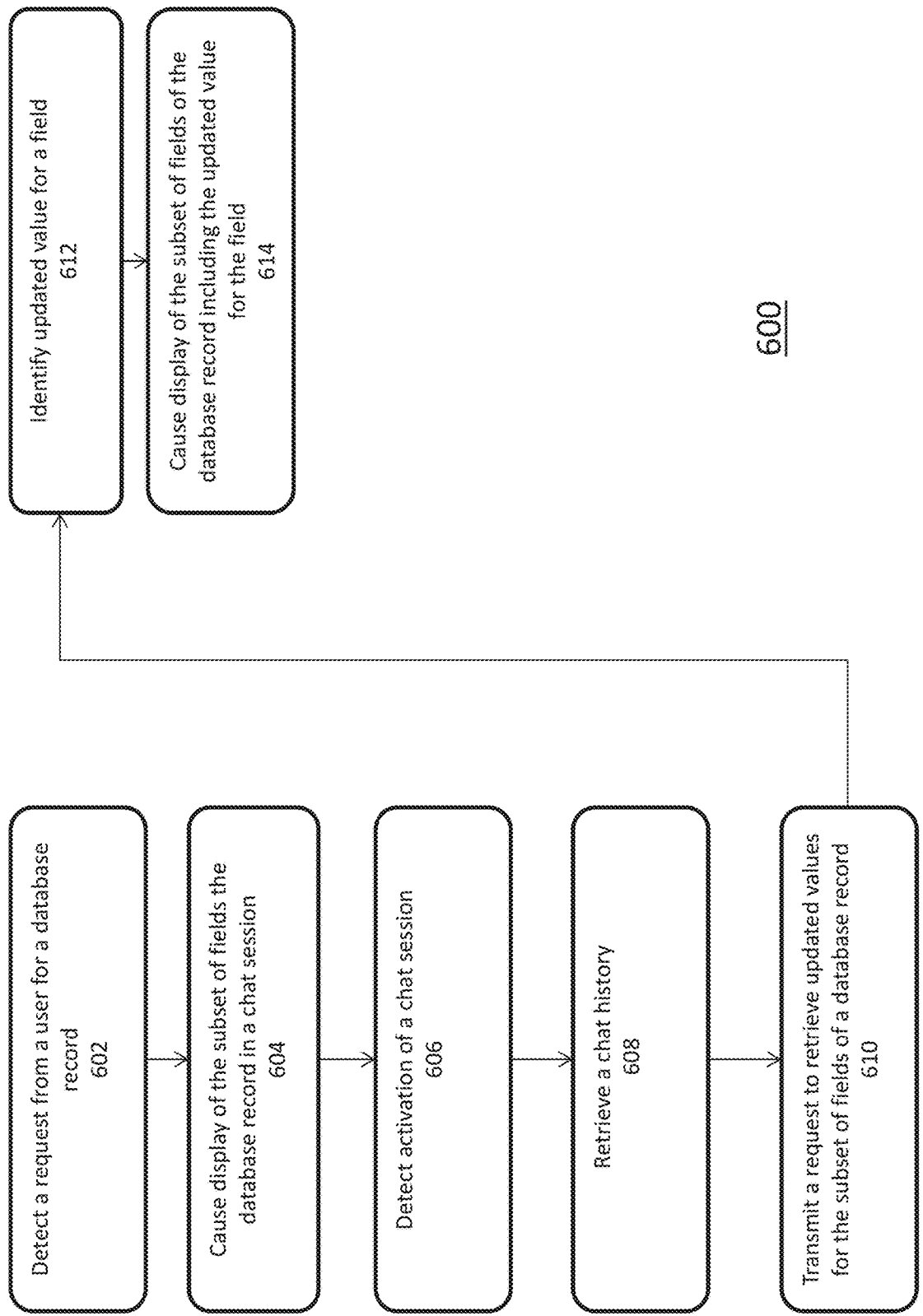
FIG. 6 is a flowchart illustrating a process of including updated values of fields of a database record, according to some embodiments.

FIG. 6 is a flowchart illustrating a process for displaying updated values of a database record in a chat session, according to some embodiments. Method 600 may be performed by processing logic that may comprise hardware (e.g., circuitry, dedicated logic, programmable logic, microcode, etc.), software (e.g., instructions executing on a processing device), or a combination thereof. It is to be appreciated that not all steps are needed to perform the disclosure provided herein. Further, some of the steps may be performed simultaneously, or in a different order than shown in FIG. 6, as will be understood by a person of ordinary skill in the art.

Method 600 shall be described with reference to FIGS. 1-2. However, method 600 is not limited to that example embodiment.

In operation 602, collaborative communications system 128 detects a request from a user for a database record. The chat session may include one or more other chat participants. The user may be one of the other chat participants. The chat participants may transmit messages, images, GIFs, emojis, and database records to one another in the chat session. Collaborative communications application 202 may transmit a request to collaborative management system 126 to retrieve the database record. The request may include an identifier of the database record. Collaborative management application 140 may retrieve the database record from records datastores 134. Collaborative management application 140 may transform the database record into a unitary user interface element, which includes a subset of fields of the database record. The subset of fields to be included in the unitary user interface may be decided based on chat session settings or user preferences.

In operation 604, collaborative communications system 128 causes display of the subset of fields the database record in a chat session. Collaborative communications application 202 may transmit a unitary user interface element of the database record to be included in the chat session to mobile collaborative application 112 or desktop collaborative application 110. Mobile collaborative application 112 or desktop collaborative application 110 may render the unitary user interface element of the database record in the chat session. As an example, mobile collaborative application 112 or desktop collaborative application 110 may be executing a chat platform. The chat session may be displayed in the chat platform, and the unitary user interface element of the database record may be displayed in the chat session.

In operation 606, collaborative communications system 128 detects activation of a chat session based on the received input. The input may be opening the chat session or attempting to initiate a chat session with the same user.

In operation 608, collaborative communications system 128 retrieves a chat history between the chat participants of the chat session in response to the activation of the chat session. The collaboration communications system 128 may retrieve the chat history from communications datastores 138 using a chat session identifier. The chat history may include previous transmissions between the chat participants. The previous transmissions may include messages, images, GIFs, emojis, and database records. Collaborative communications system 128 may identify a database record in the chat history. The database record may be associated with a database record identifier.

In operation 610, collaborative communications system 128 transmits a request to collaborative management system 126 to retrieve updated values for the subset of fields of a database record included in the chat history. The request may include the subset of fields and the database record identifier. Collaborative Management API 203 may query record datastores 134 to retrieve the updated fields of the database record included in the chat history.

In operation 612, collaborative Management API 203 identifies updated value for a field of the subset of fields of the database record. For example, the query may return the updated values for the fields that have been updated. If a field has not been updated, the query may not return a value. Collaborative management application 140 may update the unitary user interface element for the database record to reflect the updated value for the field. Collaborative management application 140 may transmit the updated unitary user interface element for the database record included the updated value for the field to collaborative communications system 128.

In operation 614, collaborative communications application 202 causes display of the subset of fields of the database record including the updated value for the field in the chat session. Collaborative communications application 202 may include the updated unitary user interface element in the chat history. Collaborative communications application 202 may transmit the chat history to mobile collaborative application 112 or desktop collaborative application 110. Mobile collaborative application 112 or desktop collaborative application 110 may display the chat history in the chat session, once opening the chat platform. This way, the chat session may include the previous transmissions between the chat participants and the unitary user interface element for the database record, including the updated value for the field of the subset of fields. The unitary user interface element may also include a message indicating the update to the field. This way, when any of the chat participants open the chat session, the current values of the fields of the database record are displayed in the chat session.

Figure 7:
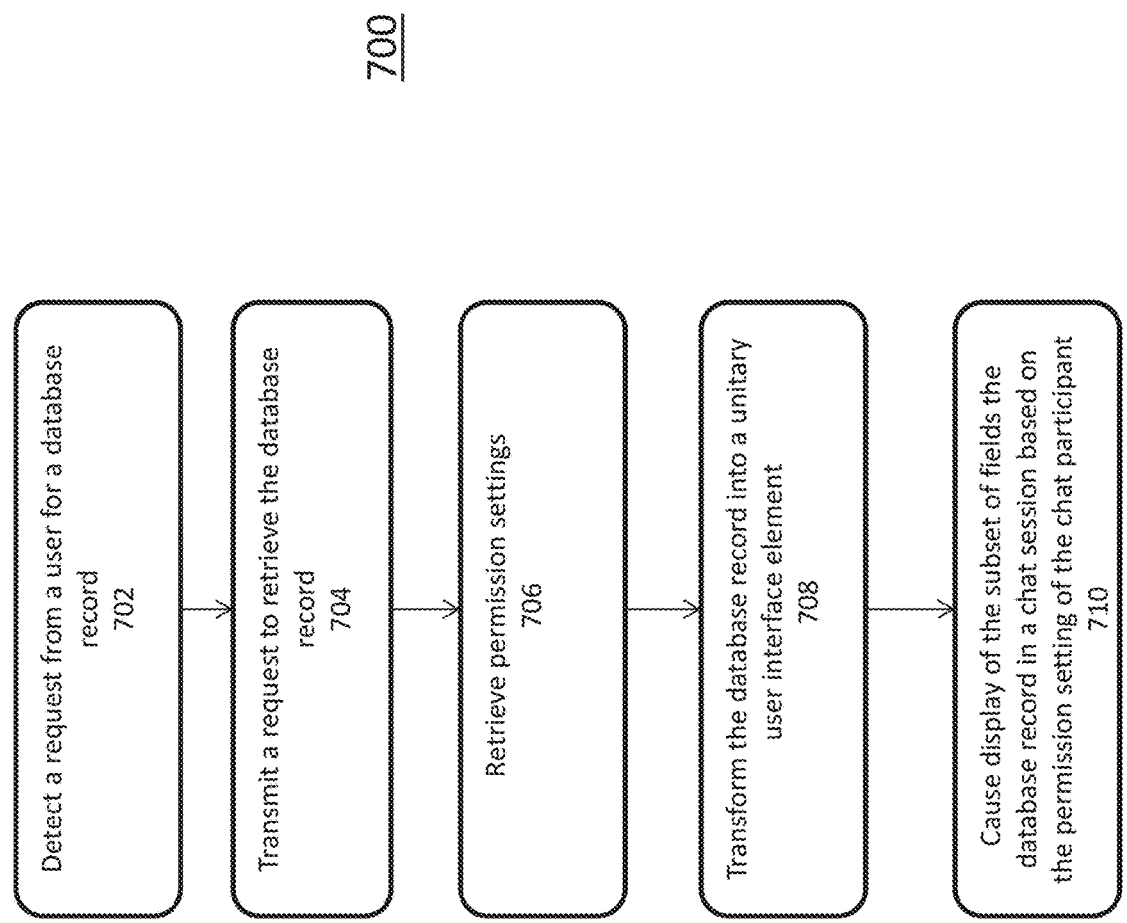
FIG. 7 is a flowchart illustrating a process of verifying a chat participant's permissions for viewing fields of a database record, according to some embodiments.

FIG. 7 is a flowchart illustrating a process for verifying a user's permissions to view fields of a database record, according to some embodiments. Method 700 may be performed by processing logic that may comprise hardware (e.g., circuitry, dedicated logic, programmable logic, microcode, etc.), software (e.g., instructions executing on a processing device), or a combination thereof. It is to be appreciated that not all steps are needed to perform the disclosure provided herein. Further, some of the steps may be performed simultaneously, or in a different order than shown in FIG. 7, as will be understood by a person of ordinary skill in the art.

Method 700 shall be described with reference to FIGS. 1-2. However, method 700 is not limited to that example embodiment.

In operation 702, collaborative communications system 128 may detect a request from a user for a database record. The chat session may include two or more chat participants. The user may be one of the chat participants. The chat participants may transmit messages, images, GIFs, emojis, and database records to one another in the chat session. The request may include identifiers of each chat participant in the chat session and a database record identifier.

In operation 704, collaborative communications application 202 may transmit a request to collaborative management system 126 to retrieve the database record. The request may include an identifier of the database record. Collaborative management application 140 may retrieve the database record from records datastores 134.

In operation 706, collaborative management application 140 may retrieve permission settings for each of the chat participants in the chat session from accounts datastores 136 using the identifiers for each chat participant. The permission settings may define which fields a chat participant is allowed to view.

In operation 708, collaborative management application 140 transforms the database record into a unitary user interface element, which includes a subset of fields of the database record. Collaborative management application 140 generates a different unitary user interface element for each chat participant based on their permission settings. For example, if a chat participant is not permitted to view a certain field of the subset of fields, collaborative management application 140 may eliminate that filed from the unitary user interface element for that user.

In operation 710, collaborative communications system 128 causes display of the subset of fields the database record in a chat session based on the permission setting of the chat participant. Collaborative communications application 202 may transmit the unitary user interface element, specific to the chat participant, to be included in the chat session to mobile collaborative application 112 or desktop collaborative application 110. Mobile collaborative application 112 or desktop collaborative application 110 may render the unitary user interface element in the chat session.

Figure 8:
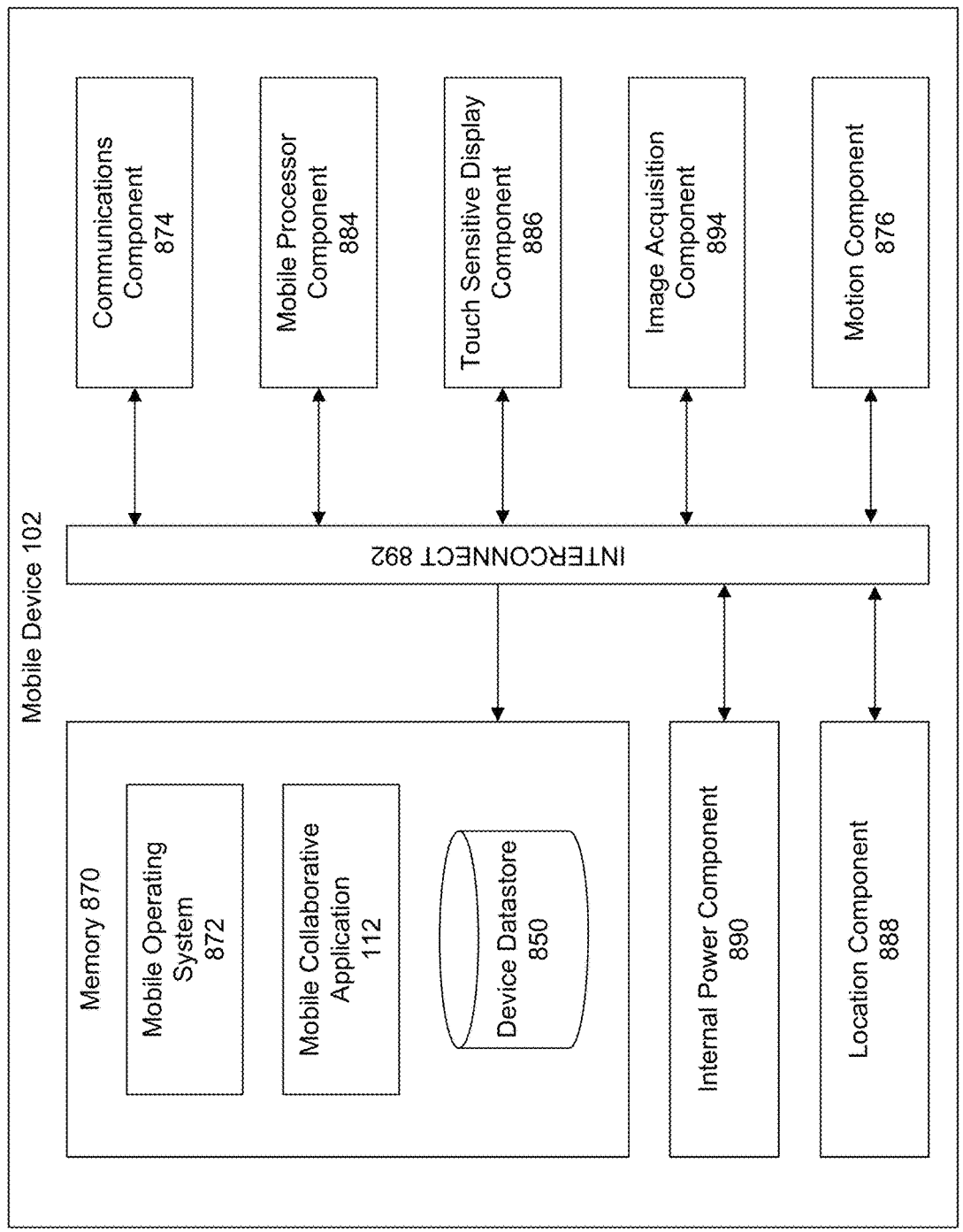
FIG. 8 is a block diagram of example components of a mobile device according to an embodiment.

FIG. 8 illustrates an example block diagram 800 of an example embodiment of the mobile device 102 executing a mobile collaborative application 112. The mobile device 102 (e.g., a mobile phone, tablet, laptop, etc.) may be generally configured to enable or allow a user to access various collaborative content and engage in real-time instant messaging of one or more target users. It is to be appreciated that while FIG. 8 illustrates one example embodiment of the mobile device 102, the example embodiment is not limited to this context.

In one embodiment, the mobile device 102 may be generally arranged to provide mobile computing and/or mobile communications and may include, but are not limited to, memory 870, communications component 874, mobile processor component 884, touch sensitive display component 886, location component 888, internal power component 890, and image acquisition component 894, where each of the components and memory 870 may be operatively connected via interconnect 892.

In one embodiment, the memory 870 may be generally arranged to store information in volatile and/or nonvolatile memory, which may include, but is not limited to, read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM) flash memory, polymer memory such as ferroelectric polymer memory, ovonic memory, phase change or ferroelectric memory, silicon-oxide-nitride-oxide-silicon (SONOS) memory, solid state memory devices (e.g., universal serial bus (USB) memory, solid state drives (SSDs), etc.), and/or any other type of storage media configured for storing information.

In one embodiment, the memory 870 may include instruction information arranged for execution by the mobile processor component 884. In that embodiment, the instruction information may be representative of at least one operating system 872, one or more applications, which may include, but are not limited to, mobile collaborative application 112. In an embodiment, the memory 870 may further include device datastore 850 which may be configured to store information associated with the mobile collaborative application 112 (e.g., cached chat history, etc.).

In one embodiment, the mobile operating system 872 may include, without limitation, mobile operating systems (e.g., Apple®, iOS®, Google® Android®, Microsoft® Windows Phone®, Microsoft® Windows®, etc.) generally arranged to manage hardware resources (e.g., one or more components of the mobile device 102, etc.) and/or software resources (e.g., one or more applications of the mobile device 102, etc.).

In one embodiment, the communications component 874 may be generally arranged to enable the mobile device 102 to communicate, directly and/or indirectly, with various devices and systems (e.g., collaborative communications system 128, etc.). The communications component 874 may include, among other elements, a radio frequency circuit (not shown) configured for encoding and/or decoding information and receiving and/or transmitting the encoded information as radio signals in frequencies consistent with the one or more wireless communications standards (e.g., Bluetooth, the Institute of Electrical and Electronics Engineers (IEEE) wireless standard 802.11, WiMAX IEEE 802.16, Global Systems for Mobile Communications (GSM), Enhanced Data Rates for GSM Evolution (EDGE), Long Term Evolution (LTE), Bluetooth standards, Near Field Communications (NFC) standards, etc.).

In one embodiment, the mobile processor component 884 may be generally arranged to execute instruction information, which may generally including one or more executable and/or interpretable instructions. In an embodiment, the processor component 884 may be a mobile processor component or system-on-chip (SoC) processor component. The processor component 884, may comprise, among other elements, processor circuit, which may further include, but is not limited to, at least one set of electronic circuits arranged to execute one or more instructions. Examples of mobile processor components 884 may include, but is not limited to, Qualcomm® Snapdragon®, NVidia® Tegra®, Intel® Atom®, Samsung® Exynos, Apple® A7®-A13®, or any other type of mobile processor(s) arranged to execute the instruction information including the one or more instructions stored in memory 870.

In one embodiment, the touch sensitive display component 886 may be generally arranged to receive and present visual display information, and provide touch input information based on detected touch based or contact based input. Moreover, the touch sensitive display component 886 may include, among other elements, display device (e.g., liquid-crystal display, light-emitting diode display, organic light-emitting diode display, etc.) for presenting the visual display information and touch sensor(s) (e.g., resistive touch sensor, capacitive touch sensor, etc.) associated with the touch sensitive display component 886 to detect and/or receive touch or contact based input information associated with the display device of the mobile device 102. Additionally, the touch sensor(s) may be integrated with the surface of the display device, so that a user's touch or contact input may substantially correspond to the presented visual display information on the display device, such as, for example, one or more user interface (UI) views and elements discussed and illustrated herein.

In one embodiment, the location component 888 may be generally arranged to receive positioning signals representative of positioning information and provide location information (e.g., approximate physical location of the mobile device 102) determined based at least partially on the received positioning information. Moreover, the location component 888 may include, among other elements, positioning circuit (e.g., a global positioning system (GPS) receiver, etc.) arranged to determine the physical location of the mobile device 102. In some embodiments, the location component 888 may be further arranged to communicate and/or interface with the communications component 874 in order to provide greater accuracy and/or faster determination of the location information.

In one embodiment, the internal power component 890 may be generally arranged to provide power to the various components and the memory of the mobile device 102. In one embodiment, the internal power component 890 may include and/or be operatively coupled to an internal and/or external battery configured to provide power to the various components (e.g., communications component 874, motion component 876, memory 870, etc.). The internal power component 890 may also be operatively coupled to an external charger to charge the battery.

In one embodiment, the image acquisition component 894 may be generally arranged to generate a digital image information using an image capture device such as, for example, a charged coupled device (CCD) image sensor (Not shown). Moreover, the image acquisition component 894 may be arranged to provide or otherwise stream digital image information captured by a CCD image sensor to the touch sensitive display component 886 for visual presentation via the interconnect 892, the mobile operating system 872, and mobile processor component 884.

Figure 9:
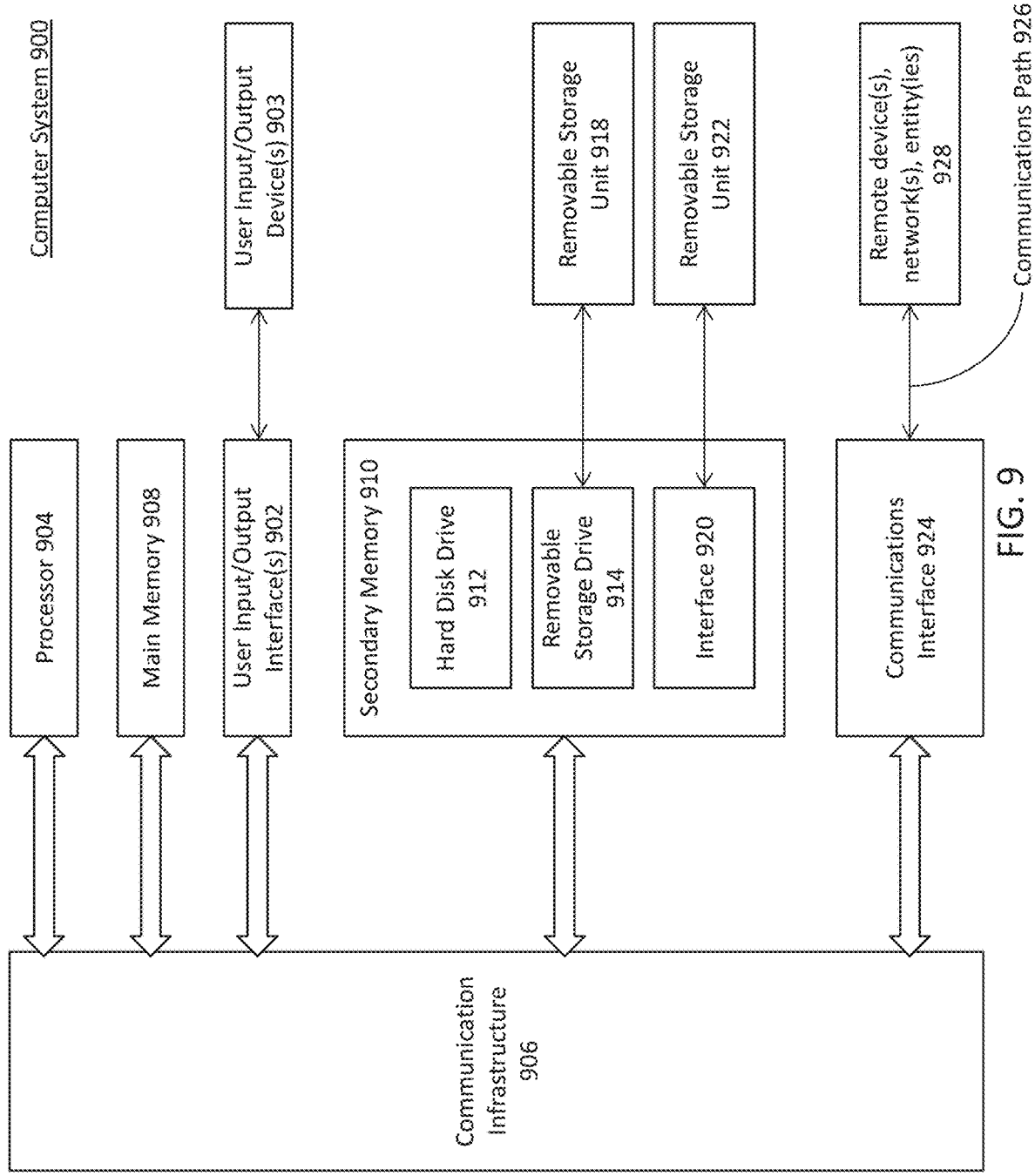
FIG. 9 is a block diagram of example components of a computing system according to an embodiment In the drawings, like reference numbers generally indicate identical or similar elements. Additionally, generally, the left-most digit(s) of a reference number identifies the drawing in which the reference number first appears.

FIG. 9 illustrates an example computer system 900 useful for implementing various embodiments. Moreover, various embodiments may be implemented, for example, using one or more well-known computer systems, such as computer system 900 shown in FIG. 9. One or more computer systems 900 may be used, for example, to implement any of the embodiments discussed herein, as well as combinations and sub-combinations thereof. For example, the computer system 900 may implement the one or more computing devices 104-*a*. In another example, one or more computing systems 900 may be communicatively coupled to each other, where each is configured to execute one or more virtual machines (not shown). The one or more virtual machines may be managed or otherwise orchestrated by one or more virtual machine managers (not shown) configured to provision and/or configure one or more virtual machines to the one or more computing systems 900. The one or more virtual machines may be further configured as a Software as a Service (SaaS), Platform as a Service (PaaS) and/or an Infrastructure as a Service (IaaS) provider configured to host or otherwise execute one or more applications associated with one or more gateways, systems, and/or datastores of FIG. 1.

Computer system 900 may include one or more processors (also called central processing units, or CPUs), such as a processor 904. Processor 904 may be connected to a communication infrastructure or bus 906.

Computer system 900 may also include customer input/output device(s) 903, such as monitors, keyboards, pointing devices, etc., which may communicate with communication infrastructure 906 through customer input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments may operate with software, hardware, and/or operating system implementations other than those described herein.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

The foregoing description of the specific embodiments will so fully reveal the general nature of the disclosure that others may, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments but should be defined only in accordance with the following claims and their equivalents.

What is claimed is:

1. A method comprising:
   detecting, by one or more computing devices, a request from a user to transmit a database record within a chat session, the chat session comprising a plurality of messages exchanged between a plurality of chat participants including the user;
   causing, by the one or more computing devices and in response to the request from the user, display of a user interface element positioned after one of the plurality of messages within the chat session, the user interface element comprising a subset of fields of the database record, wherein the chat session is deactivated after causing display of the user interface element;
   detecting, by the one or more computing devices, an activation of the chat session after the chat session is deactivated;
   transmitting, by the one or more computing devices, a request to retrieve current values of the subset of fields in response to detecting the activation;
   identifying, by the one or more computing devices, an updated value for a field of the subset of fields based on the current values of the subset of fields;
   generating, by the one or more computing devices, a visual indication of the field changing from a previous value to the updated value in response to identifying the updated value for the field;
   modifying, by the one or more computing devices, the user interface element within the chat session to include the updated value for the field and the visual indication; and
   causing display of the chat session with the modified user interface element.

2. The method of claim 1, further comprising:
   in response to detecting the activation of the chat session:
      retrieving, by the one or more computing devices, the chat session using a chat session identifier, wherein the chat session comprises the plurality of messages exchanged between the plurality of chat participants; and
      identifying, by the one or more computing devices, the database record in the chat session,
      wherein the request to retrieve the current values includes an identifier of the database record.

3. The method of claim 1, wherein activation of the chat session is in response to detecting an activation request to open the chat session.

4. The method of claim 1, further comprising:
   receiving, by the one or more computing devices, input from at least one chat participant of the plurality of chat participants to activate the chat session;
   identifying, by the one or more computing devices, a user identifier of the at least one chat participant;
   retrieving, by the one or more computing devices, a permission setting of the at least one chat participant; and
   identifying, by the one or more computing devices, a portion of the database record authorized for display for the at least one chat participant based on the permission setting, wherein the portion of the database record includes the subset of fields.

5. The method of claim 1, further comprising:
   identifying, by the one or more computing devices, a type of the database record;
   identifying, by the one or more computing devices, an icon corresponding to the type of the database record; and
   cause display, by the one or more computing devices, of the icon with the subset of fields in the chat session.

6. The method of claim 5, in response to detecting the updated value for the field of the subset of fields, the method further comprising:
   identifying, by the one or more computing devices, a change in the type of the database record based on the updated value;
   identifying, by the one or more computing devices, a new icon for the database record based on the change in the type of the database record; and
   cause display, by the one or more computing devices, of the new icon with the subset of fields.

7. The method of claim 1, wherein the chat session is deactivated in response to receiving an input to close the chat session or a timing out of the chat session after a predetermined amount of time.

8. The method of claim 1, wherein the user interface element displayed in the chat session comprises a name of the database record.

9. A system comprising:
   a memory;
   a processor coupled to the memory, the processor configured to:
   detect a request from a user to transmit a database record within a chat session, the chat session comprising a plurality of messages exchanged between a plurality of chat participants including the user;
   cause, in response to the request from the user, display of a user interface element positioned after one of the plurality of messages within the chat session, the user interface element comprising a subset of fields of the database record, wherein the chat session is deactivated after the user interface element is displayed within the chat session;
   detect an activation of the chat session after the chat session is deactivated;
   transmit a request to retrieve current values of the subset of fields in response to detecting the activation;
   identify an updated value for a field of the subset of fields based on the current values of the subset of fields;
   generate a visual indication of the field changing from a previous value to the updated value in response to identifying the updated value for the field;
   modify the user interface element within the chat session to include the updated value for the field and the visual indication; and
   cause display of the chat session with the modified user interface element.

10. The system of claim 9, in response to detecting the activation of the chat session, the processor further configured to:
    retrieve the chat session using a chat session identifier, wherein the chat session comprises the plurality of messages exchanged between the plurality of chat participants; and
    identify the database record in the chat session,
    wherein the request to retrieve the current values includes an identifier of the database record.

11. The system of claim 9, wherein activation of the chat session is in response to detecting an activation request to open the chat session.

12. The system of claim 9, the processor further configured to:
    receive input from at least one chat participant of the plurality of chat participants to activate the chat session;

identify a user identifier of the at least one chat participant;

retrieve a permission setting of the at least one chat participant; and identify a portion of the database record authorized for display for the at least one chat participant based on the permission setting, wherein the portion of the database record includes the subset of fields.

13. The system of claim 9, the processor further configured to:

identify a type of the database record;

identify an icon corresponding to the type of the database record; and cause display of the icon with the subset of fields in the chat session.

14. The system of claim 13, in response to detecting the updated value for the field of the subset of fields the processor further configured to:

identify a change in the type of the database record based on the updated value;

identify a new icon for the database record based on the change in the type of the database record; and render the new icon with the subset of fields.

15. The system of claim 9, wherein the chat session is deactivated in response to receiving an input to close the chat session or a timing out of the chat session after a predetermined amount of time.

16. A non-transitory computer-readable medium having instructions stored thereon, execution of which, by one or more processors of a device, cause the one or more processors to perform operations comprising:

detecting a request from a user to transmit a database record within a chat session, the chat session comprising a plurality of messages exchanged between a plurality of chat participants including the user;

causing, in response to the request from the user, display of a user interface element positioned after one of the plurality of messages within the chat session, the user interface element comprising a subset of fields of the database record, wherein the chat session is deactivated after causing display of the user interface element;

detecting an activation of the chat session after the chat session is deactivated;

transmitting a request to retrieve current values of the subset of fields in response to detecting the activation;

identifying an updated value for a field of the subset of fields based on the current values of the subset of fields;

generating a visual indication of the field changing from a previous value to the updated value in response to identifying the updated value for the field;

modifying the user interface element within the chat session to include the updated value for the field and the visual indication; and causing display of the chat session with the modified user interface element.

17. The non-transitory computer-readable medium of claim 16, in response to detecting the activation of the chat session the operations further comprising:

retrieving the chat session using a chat session identifier, wherein the chat session comprises the plurality of messages exchanged between the plurality of chat participants;

identifying the database record in the chat session, wherein the request to retrieve the current values of the includes an identifier of the database record.

18. The non-transitory computer-readable medium of claim 16, wherein activation of the chat session is in response to detecting an activation request to open the chat session.

19. The non-transitory computer-readable medium of claim 16, the operations further comprising:

receive input from at least one chat participant of the plurality of chat participants to activate the chat session;

identify a user identifier of the at least one chat participant;

retrieve a permission setting of the at least one chat participant; and identify a portion of the database record authorized for display for the at least one chat participant based on the permission setting, wherein the portion of the database record includes the subset of fields.

* * * * *

UNITED STATES PATENT AND TRADEMARK OFFICE
CERTIFICATE OF CORRECTION

PATENT NO. : 11,159,470 B1
APPLICATION NO. : 16/926155
DATED : October 26, 2021
INVENTOR(S) : Nate Botwick et al.

Page 1 of 1

It is certified that error appears in the above-identified patent and that said Letters Patent is hereby corrected as shown below:

In the Claims

Claim 17, Column 22, Line 22, "current values of the" should read --current values--.

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*